No. 810,035. PATENTED JAN. 16, 1906.
J. A. CHAMBERS.
APPARATUS FOR DRAWING GLASS.
APPLICATION FILED FEB. 15, 1905.

2 SHEETS—SHEET 1.

WITNESSES
INVENTOR

UNITED STATES PATENT OFFICE.

JAMES A. CHAMBERS, OF ALLEGHENY, PENNSYLVANIA, ASSIGNOR TO WILLIAM J. PATTON, OF ALLEGHENY, PENNSYLVANIA.

APPARATUS FOR DRAWING GLASS.

No. 810,035.  Specification of Letters Patent.  Patented Jan. 16, 1906.

Application filed February 15, 1905. Serial No. 245,781.

*To all whom it may concern:*

Be it known that I, JAMES A. CHAMBERS, of Allegheny, in the county of Allegheny and State of Pennsylvania, have invented a certain new and useful Apparatus for Drawing Glass, of which the following is a full, clear, and exact description, reference being had to the accompanying drawings, forming part of this specification, in which—

Figure 1:
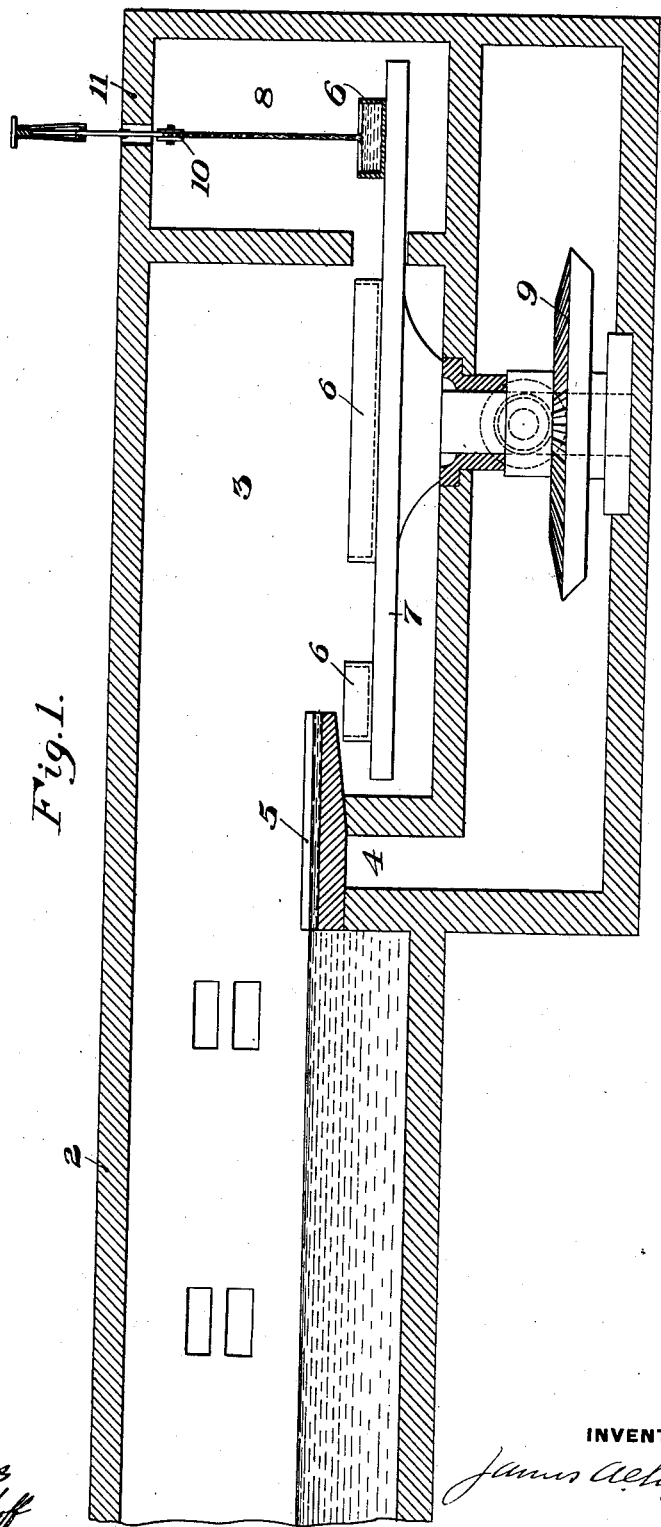
Figure 2:
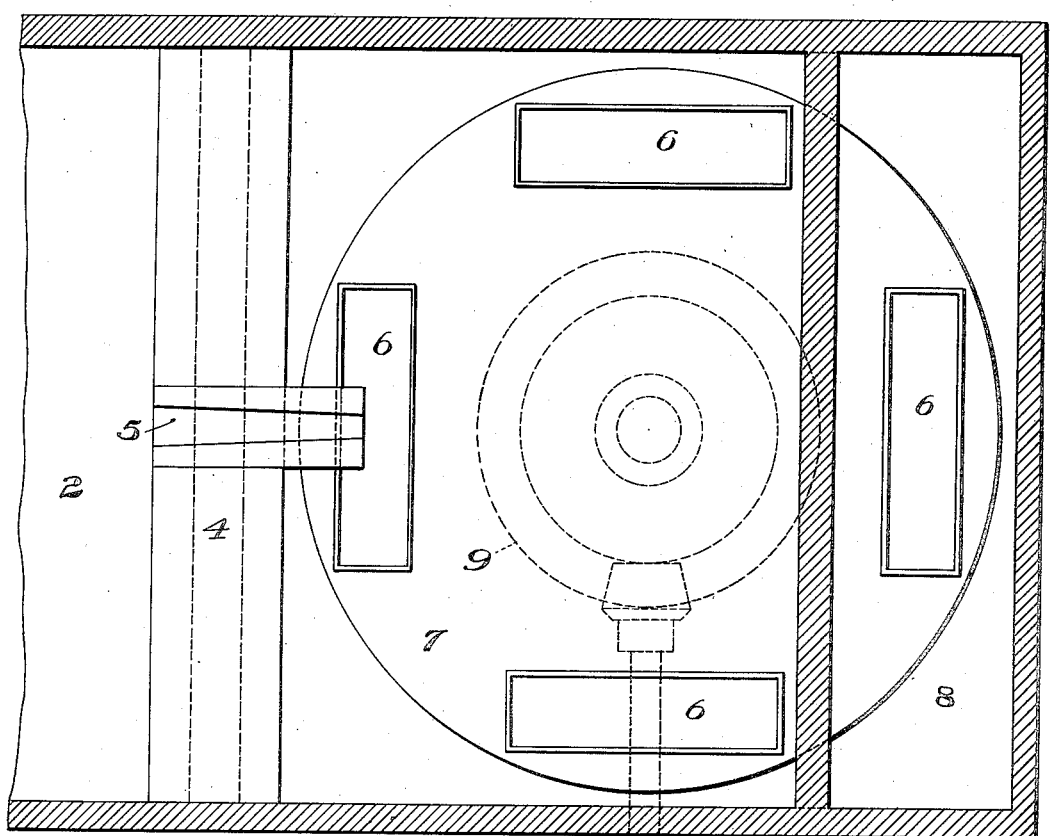
Figure 3:
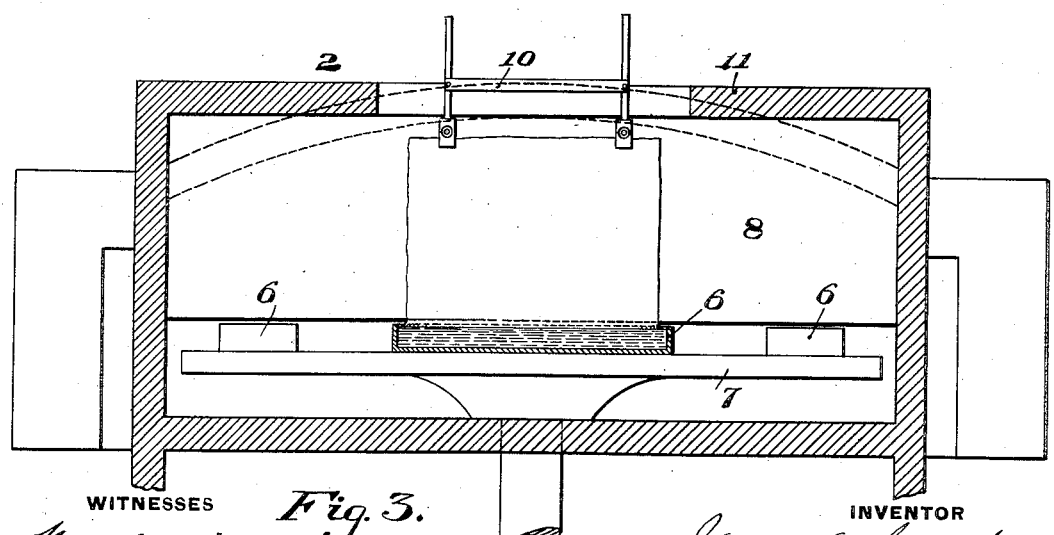

Figure 1 is a longitudinal vertical section of a tank-furnace constructed in accordance with my invention. Fig. 2 is a sectional plan view, and Fig. 3 is a vertical cross-section, of the drawing-chamber.

My invention relates to the drawing of glass articles from separate pots or receptacles into which the glass is fed, and it is designed to provide a simple and efficient apparatus which will do away with ladling and enable the glass to be fed directly from a tank into the receptacle, which is then carried into the drawing-chamber; and it consists in the arrangement and combination of a tank-chamber having a casting-outlet, with a pot-chamber having a movable table or carrier adapted to support the pots, and a drawing-chamber communicating with the pot-chamber, whereby the pots are filled at the casting-outlet, carried into the drawing-chamber, where the glass is drawn from the pots, and, finally, the pots containing the hardened residue of the glass are again carried into the pot-chamber, where this residue is melted before the pots are refilled.

Heretofore where glass has been drawn from pots or other receptacles after the drawing operation has been finished it has been necessary to tilt the pot or receptacle in order to empty it of the hardened residue. This operation is a slow and exceedingly objectionable one, owing to the fact that there is a wasting of the glass and for the further reason that a certain portion of the residue usually adheres to the pot and not being thoroughly remelted causes a deterioration of the fresh charge of glass when it is introduced into the pot. By my invention these objectionable features of the old process are obviated.

In the drawings, 2 represents a portion of a tank-furnace having a pot-chamber 3 opening into the tank-chamber over the bridge 4, which may be either hollow or solid, as desired. The bridge is provided with an overflow-trough 5, through which the glass flows into refractory pots or pans 6, set upon a rotary table 7. The table 7 is arranged so that its major portion is within the chamber 3, while at the same time a minor portion of it is within the close drawing-chamber 8. The pans or pots are so arranged that while several of them are within the feeding-chamber 3 the remaining receptacle is within the drawing-chamber 8. The table may be turned by any suitable form of gearing, such as the bevel-gearing 9, shown as located within a pit below the pot and drawing chambers. The drawing apparatus (indicated at 10) may be of any suitable form and may extend up through a slot in the roof 11 to the drawing-chamber.

In using the apparatus the table is rotated intermittently, so that the glass is overflowing into one pot or pan while the sheets or other glass articles are being drawn up out of another pot or pan within the drawing-chamber. When the drawing operation is finished, the table is given a partial turn, thus bringing the filled pot away from the overflow-trough and moving an empty pot which contains some hardened glass into the pot-chamber, where the hardened glass is remelted and the pot comes into position to be filled. At the same time the pot from which the glass was drawn is moved from the drawing-chamber into the pot-chamber and a filled pot is moved into the drawing-chamber.

The advantages of my invention result from feeding the glass directly from the tank into a series of pots or a carrier, which carries the glass into the drawing-chamber, where the glass is drawn, and then carries the empty pots containing the residue of glass back to the pot-chamber, where the hardened residue is remelted before the pot is refilled, thus obviating the necessity of tilting the pot, preventing the waste of glass, and also preventing the deterioration of the glass which is caused by the mixture in the pot of freshly-molten glass with a hardened residue. The glass is thus kept within heated chambers, no ladling is necessary, and the glass remaining in the pot after drawing will be fined and reduced to proper condition by the action of the heat within the pot-chamber and the glass fed in from the tank.

Many variations may be made in the form and arrangement of the drawing-chamber, the pot-chamber, the carrier, and the tank without departing from my invention.

Having thus described my invention, what

I claim, and desire to secure by Letters Patent, is—

1. In a glass-drawing apparatus, a tank-furnace having a heated pot-chamber, and a close drawing-chamber communicating therewith, in combination with a carrier, having a pot or receptacle, said carrier being adapted to carry the pot or receptacle from the pot-chamber to the drawing-chamber and then back to the pot-chamber, substantially as described.

2. A tank-furnace having a pot-chamber and a casting-outlet leading from the tank to the pot-chamber, and a drawing-chamber in combination with a carrier having pots or receptacles and means for so moving the carrier intermittently as to bring the pots or receptacles from the pot-chamber to the drawing-chamber and then back to the pot-chamber, substantially as described.

3. In a glass-drawing apparatus a heated chamber communicating with the tank-chamber, and containing a carrier having pots or receptacles, means for feeding glass from the tank into said pots or receptacles, a drawing-chamber through which the carrier moves, said chamber having an opening in the roof thereof, glass-drawing apparatus adapted to draw the glass through said opening, and means for so moving the carrier intermittently as to bring the pots or receptacles from the pot-chamber to the drawing-chamber, and then back to the pot-chamber, substantially as described.

In testimony whereof I have hereunto set my hand.

JAMES A. CHAMBERS.

Witnesses:
GEO. B. BLEMING,
JAMES K. BAKEWELL.